United States Patent
Tahara et al.

(10) Patent No.: US 11,128,200 B2
(45) Date of Patent: Sep. 21, 2021

(54) ROTATING ELECTRIC MACHINE

(71) Applicant: Mitsubishi Electric Corporation, Tokyo (JP)

(72) Inventors: Jun Tahara, Tokyo (JP); Yosuke Uno, Tokyo (JP); Tomoaki Shimano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 569 days.

(21) Appl. No.: 16/045,852

(22) Filed: Jul. 26, 2018

(65) Prior Publication Data
US 2019/0288582 A1    Sep. 19, 2019

(30) Foreign Application Priority Data
Mar. 15, 2018   (JP) .............................. JP2018-047498

(51) Int. Cl.
| H02K 9/04 | (2006.01) |
| H02K 5/20 | (2006.01) |
| H02M 1/14 | (2006.01) |
| H02K 5/22 | (2006.01) |
| H02P 27/06 | (2006.01) |
| H02K 11/33 | (2016.01) |
| H02K 11/00 | (2016.01) |
| H02K 9/06 | (2006.01) |

(52) U.S. Cl.
CPC ................. *H02K 9/04* (2013.01); *H02K 5/20* (2013.01); *H02K 5/22* (2013.01); *H02K 11/0094* (2013.01); *H02K 11/33* (2016.01); *H02M 1/143* (2013.01); *H02P 27/06* (2013.01); *H02K 9/06* (2013.01)

(58) Field of Classification Search
CPC .. H02K 9/04; H02K 5/20; H02K 5/22; H02K 11/0094; H02K 11/33; H02K 9/06; H02M 1/14; H02M 1/143; H02M 7/003; H02P 27/06
See application file for complete search history.

(56) References Cited

U.S. PATENT DOCUMENTS

| 2005/0253457 A1 | 11/2005 | Pierret et al. | |
| 2007/0024133 A1* | 2/2007 | Kato | H02K 11/30 310/68 D |
| 2013/0301220 A1* | 11/2013 | Hotta | H05K 7/20218 361/699 |

(Continued)

FOREIGN PATENT DOCUMENTS

| JP | 2005-532025 A | 10/2005 |
| JP | 2016-42770 A | 3/2016 |

(Continued)

OTHER PUBLICATIONS

Communication dated Apr. 9, 2019 by the Japanese Patent Office in counterpart application No. 2018-047498.

*Primary Examiner* — Naishadh N Desai
(74) *Attorney, Agent, or Firm* — Sughrue Mion, PLLC; Richard C. Turner

(57) ABSTRACT

A rotating-electric-machine main body and an electric-power supply unit are integrally fixed to each other, the smoothing capacitor provided in the electric-power supply unit is disposed in such a way as to be cooled by cooling air flowing from the outside of a housing of the rotating-electric-machine main body to an air inlet provided in the housing.

15 Claims, 6 Drawing Sheets

(56) References Cited

U.S. PATENT DOCUMENTS

| | | | |
|---|---|---|---|
| 2014/0203675 A1* | 7/2014 | Maeda | H02K 9/06 |
| | | | 310/59 |
| 2016/0065030 A1* | 3/2016 | Fujimoto | H02K 11/33 |
| | | | 180/446 |
| 2016/0226333 A1 | 8/2016 | Falguier et al. | |
| 2017/0317562 A1* | 11/2017 | Asano | H02K 11/25 |

FOREIGN PATENT DOCUMENTS

| | | |
|---|---|---|
| JP | 2016-537959 A | 12/2016 |
| JP | 2017-184295 A | 10/2017 |
| WO | 2017/134372 A1 | 8/2017 |

* cited by examiner

ROTATING ELECTRIC MACHINE

BACKGROUND OF THE INVENTION

Field of the Invention

The present application relates to a rotating electric machine in which a rotating-electric-machine main body and an electric-power supply unit including a power circuit unit are integrated with each other, and particular to a rotating electric machine to be mounted in a vehicle such as an automobile.

Description of the Related Art

As disclosed, for example, in Patent Document 1, there has been known a rotating electric machine in which a rotating-electric-machine main body and an electric-power supply unit including a power circuit unit are integrated with each other and that is mounted in a vehicle such as an automobile. When the rotating electric machine operates as an electric motor that drives an internal combustion engine, the foregoing electric-power supply unit including a power circuit unit converts DC electric power from a DC power source such as a battery mounted in a vehicle into AC electric power and supplies the AC electric power to the rotating-electric-machine main body. When the rotating electric machine is driven by the internal combustion engine so as to operate as an electric power generator, the electric-power supply unit converts AC electric power generated by the rotating-electric-machine main body into DC electric power and supplies the DC electric power to the DC power source. As is well known, the power circuit unit is formed of a plurality of semiconductor switching devices.

The foregoing electric-power supply unit is provided with a smoothing capacitor for absorbing a ripple current produced when a semiconductor switching device included in the power circuit unit operates, magnetic-field circuit unit that supplies a magnetic-field current to the rotor winding of the rotating-electric-machine main body, a control circuit that controls the power circuit unit and the magnetic-field circuit unit, and the like, in addition to the power circuit unit. These constituent elements in the electric-power supply unit are container in a space formed of a metal housing, a case, and the like.

PRIOR ART REFERENCE

Patent Document

[Patent Document 1] National Publication of International Patent Application No. 2016-537959

The smoothing capacitor in the foregoing electric-power supply unit generates heat, due to a ripple current produced when a semiconductor switching device operates; thus, the smoothing capacitor needs to be cooled. However, in order to cool the smoothing capacitor with cooling air flowing in the radial direction of the rotating-electric-machine main body, it is required to make the smoothing capacitor protrude in the radial direction of the rotating-electric-machine main body; thus, there has been a problem that the electric-power supply unit is enlarged in the radial direction and interferes with other apparatuses in the vicinity thereof.

The present application has been made in order to solve the foregoing problem in a conventional rotating electric machine; the objective thereof is to provide a rotating electric machine that is not enlarged in the radial direction and in which the smoothing capacitor in the electric-power supply unit can efficiently be cooled.

SUMMARY OF THE INVENTION

A rotating electric machine disclosed in the present application includes a rotating-electric-machine main body and an electric-power supply unit; the rotating-electric-machine main body and the electric-power supply unit are arranged in parallel with each other in an axle direction of the rotating-electric-machine main body so as to be integrally fixed to each other; the rotating electric machine is characterized in that the rotating-electric-machine main body includes a stator fixed to a housing, a rotor fixed to a rotor axle pivotably supported by the housing, and a cooling fan that rotates along with the rotor, that makes an air inlet being provided, in the housing and having an opening in the axle direction take cooling air into the housing, and that makes an air outlet provided in the housing exhaust the cooling air to the outside of the housing, in that the electric-power supply unit includes a power circuit unit provided with a power semiconductor module for controlling electric power to be supplied to the rotating-electric-machine main body and a smoothing capacitor for smoothening an electric current flowing in a stator winding of the rotating-electric-machine main body, a control board provided with a control circuit unit for controlling the power circuit unit, and a metal housing on which the power circuit unit and the control board are mounted, and in that the smoothing capacitor is mounted on the metal housing, at a position where the smoothing capacitor is cooled by the cooling air that is taken into the air inlet from the outside of the housing.

In a rotating electric machine disclosed in the present application, the rotating-electric-machine main body includes a stator fixed to a housing, a rotor fixed to a rotor axle pivotably supported by the housing, and a cooling fan that rotates along with the rotor, that makes an air inlet being provided in the housing and having an opening in the axle direction take cooling air into the housing, and that makes an air outlet provided in the housing exhaust the cooling air to the outside of the housing; the electric-power supply unit includes a power circuit unit provided with a power semiconductor module for controlling electric power to be supplied to the rotating-electric-machine main body and a smoothing capacitor for smoothening an electric current flowing in a stator winding of the rotating-electric-machine main body, a control board provided with a control circuit unit for controlling the power circuit unit, and a metal housing on which the power circuit unit and the control board are mounted; the smoothing capacitor is mounted on the metal housing, at a position where the smoothing capacitor is cooled by the cooling air that is taken into the air inlet from the outside of the housing. As a result, the smoothing capacitor can be disposed in the axle direction; thus, the rotating electric machine is suppressed from expanding in the radial direction and hence can be downsized.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
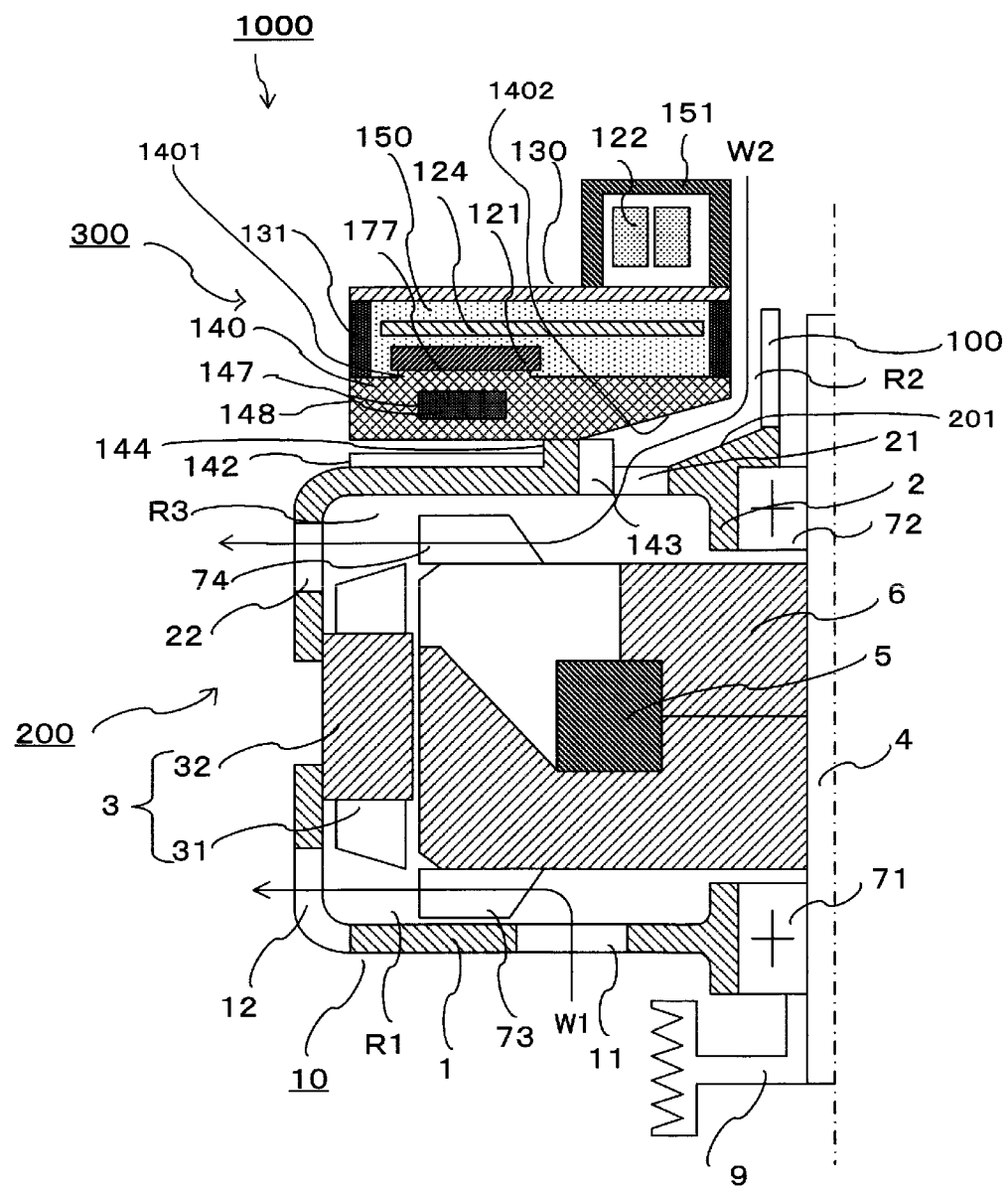
FIG. 1 is a principal-part cross-sectional view illustrating a rotating electric machine according to Embodiment 1.
Figure 2:
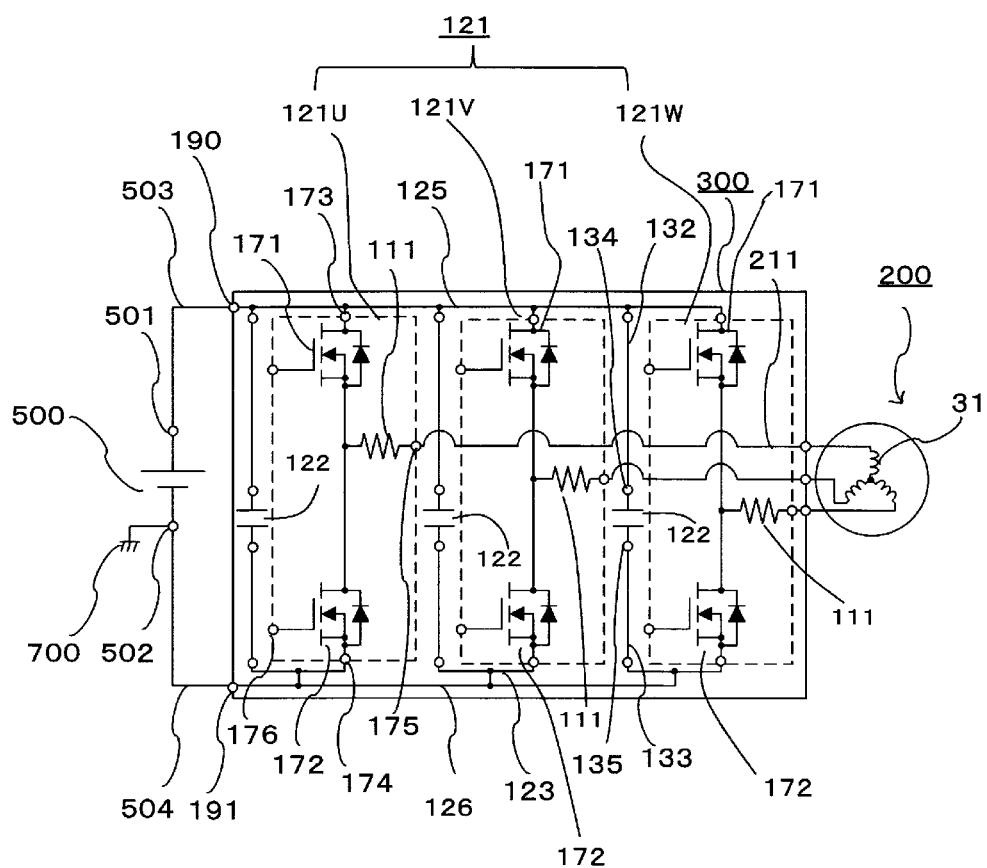
FIG. 2 is a circuit diagram of the rotating electric machine according to Embodiment 1.
Figure 3:
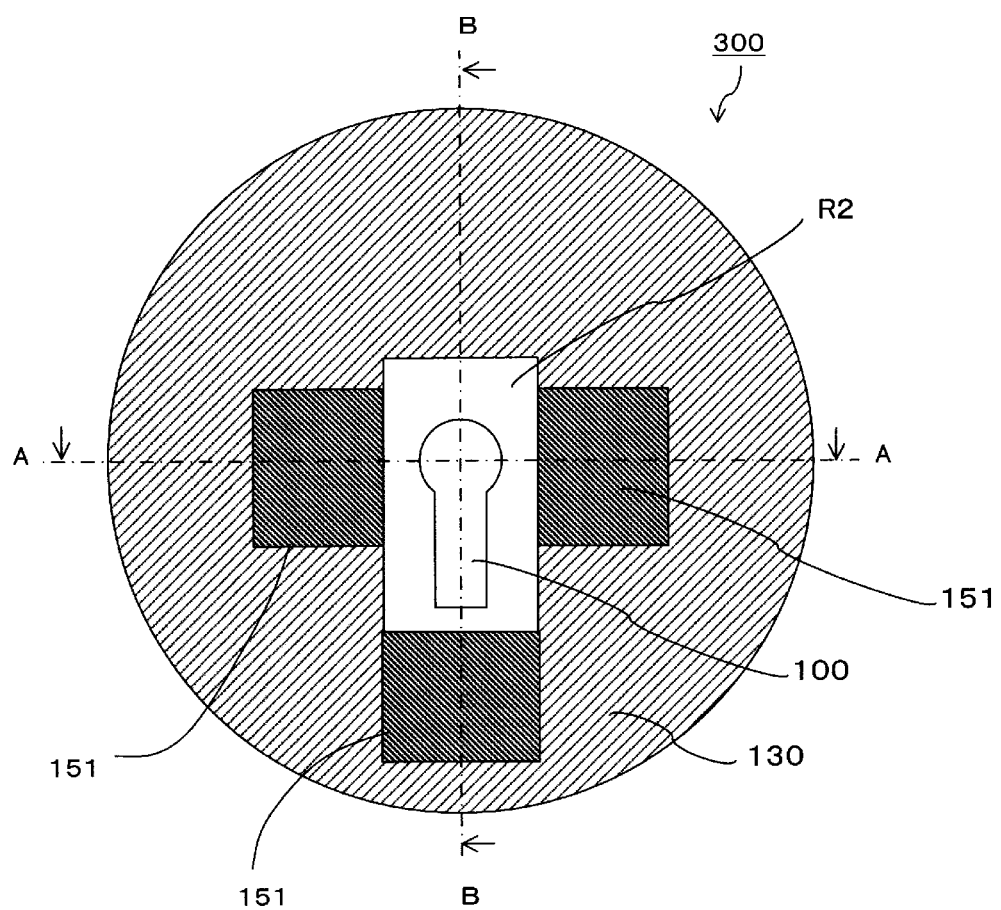
FIG. 3 is an explanatory view illustrating an electric-power supply unit of the rotating electric machine according to Embodiment. 1.
Figure 4:
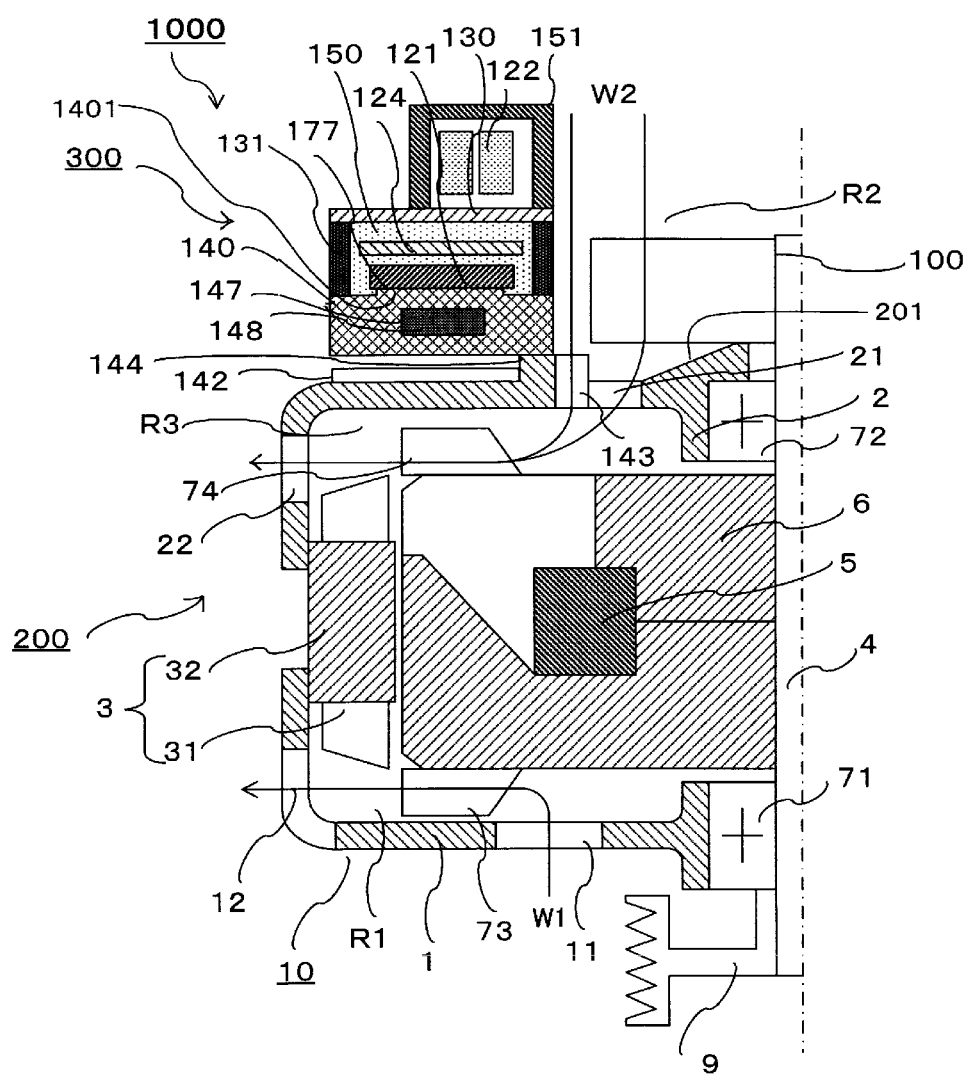
FIG. 4 is a principal-part cross-sectional view illustrating the rotating electric machine according to Embodiment 1.

FIG. 1 is a principal-part cross-sectional view illustrating a rotating electric machine according to Embodiment 1; FIG. 1 illustrates the cross section thereof, taken along the line A-A in FIG. 3, when the rotating electric machine is viewed in the direction of the arrows. FIG. 2 is a circuit diagram mainly including the electric-power supply unit of the rotating electric machine according to Embodiment 1; FIG. 3 is an explanatory view illustrating the electric-power supply unit of the rotating electric machine according to Embodiment 1; FIG. 4 is a principal-part cross-sectional view illustrating the rotating electric machine according to Embodiment 1; FIG. 4 illustrates the cross section thereof, taken along the line B-B in FIG. 3, when the rotating electric machine is viewed in the direction of the arrows.

In FIGS. 1, 2, 3, and 4, a rotating electric machine 1000 has a rotating-electric-machine main body 200 and an electric-power supply unit 300 that is integrated with the rotating-electric-machine main body 200, that is situated in parallel with the rotating-electric-machine main body 200 in the axle direction of the rotating-electric-machine main body 200, and that supplies electric power to the rotating-electric-machine main body 200. The rotating-electric-machine main body 200 can operate as an electric motor that drives an internal combustion engine (unillustrated) or as an electric power generator that is driven by the internal combustion engine and generates electric power. The rotating electric machine according to Embodiment 1 is configured as a rotating electric machine for starting an internal combustion engine.

The rotating-electric-machine main body 200 is provided with a housing 10 including a front bracket 1 as a load-side bracket formed in the shape of a bowl, by use of a metal material such as iron, and a rear bracket 2 as an anti-load-side bracket, a rotor 6 fixed on the rotor axle 4, a magnetic-field winding 5 provided in the rotor 6, and a stator 3. The stator 3 has a stator iron core 32 and a stator winding 31 mounted on the stator iron core 32.

The rotor axle 4 is pivotably supported by the housing 10 by use of a front-side bearing 71 provided in the front bracket 1 and a rear-side bearing 72 provided in the rear bracket 2. The rotor 6 is fixed on the rotor axle 4 and is pivotably disposed in the housing 10. The stator iron core 32 is fixed to the housing 10 in such a way as to be sandwiched between one axle-direction end portion of the front bracket 1 and the other axle-direction end portion of the rear bracket 2. The inner circumferential surface of the stator 3 radially faces the cutter circumferential surface of the rotor 6 via a predetermined air gap.

A pulley 9 is mounted on the front-side end portion, of the rotor axle 4, that protrudes from the front bracket 1 toward the side opposite to the rotating-electric-machine main body 200. The rotating-electric-machine main body 200 is coupled with the crankshaft (unillustrated) of the internal combustion engine, through the intermediary of the pulley 9 and a belt (unillustrated) bound around the pulley 9.

A first cooling fan 73 fixed to the front-side endface of the rotor 6 rotates along with the rotor 6. A second cooling fan 74 fixed to the rear-side endface of the rotor 6 rotates along with the rotor 6. In the axle-direction end portion of the front bracket 1, there is provided a first air inlet 11 that takes cooling air into the rotating-electric-machine main body 200; in the axle-direction end portion of the rear bracket 2, there is provided a second air inlet 21 that takes cooling air into the rotating-electric-machine main body 200. Around the rotor axle 4, a plurality of first air inlets 11 and a plurality of second air inlets 21 are provided. In the outer-circumferential surface portion of the front bracket 1, there is provided a first air outlet 12 that exhausts cooling air from the inside of the rotating-electric-machine main body 200 to the outside; in the outer-circumferential surface portion of the rear bracket 2, there is provided a second air outlet 22 that exhausts cooling air from the inside of the rotating-electric-machine main body 200 to the outside.

A first ventilation path R1 that connects the first air inlet 11 with the first air outlet 12 is formed between the axle-direction inner-side end face of the front bracket 1 and the axel-direction end face, at the load side, of the rotor 6. The first cooling fan 73 is disposed in the first ventilation path R1. A second ventilation path R2 is formed between the inner circumferential portion of the electric-power supply unit 300, described later, and the outer circumferential surface of the rotor axle 4 and connects the outside of the rotating electric machine 1000 with the second air inlet 21 of the rear bracket 2. A third ventilation path R3 that connects the second air inlet 21 with the second air outlet 22 is formed between the axle-direction inner endface of the rear bracket 2 and the axel-direction endface, at the side opposite to the load, of the rotor 6. The second cooling fan 74 is disposed in the third ventilation path R3.

Due to centrifugal force produced by the rotation of the first cooling fan 73, a first cooling air W1 is taken in by the first air inlet 11 from the outside of the front bracket 1 and then is exhausted from the first ventilation path R1 to the outside of the rotating-electric-machine main body 200 through the first air outlet 12. Due to centrifugal force produced by the rotation of the second cooling fan 71, a second cooling air W2 is taken into the second ventilation path R2 from the outside of the electric-power supply unit 300 in the rotating electric machine 1000, reaches the third ventilation path R3 through the second air inlet 21 of the rear bracket 2, and then is exhausted to the outside of the rotating-electric-machine main body 200 through the second air outlet 22.

The electric-power supply unit 300 are configured with after-mentioned power semiconductor modules 121 including upper-arm power semiconductor switching devices, lower-arm power semiconductor switching devices, and shunt resistors, smoothing capacitors 122, a resin case 131, a resin cover 130, a control board 124, a metal housing 140, a brush 100, a rotation sensor (unillustrated), and the like. The power circuit unit includes the power semiconductor module 121 and the smoothing capacitors 122. The metal housing 140 has a function as a heat sink.

The power semiconductor modules 121 are configured in such a way that a single power semiconductor module corresponds to a single phase; when the rotating-electric-machine main body 200 is a 3-phase rotating electric machine, there are provided three power semiconductor modules 121 that are connected in parallel with one another. That is to say, in Embodiment 1, the rotating-electric-machine main body 200 is formed as a 3-phase rotating-electric-machine main body; thus, as represented in FIG. 2, the power semiconductor module 121 includes a U-phase power semiconductor module 121U, a V-phase power semiconductor module 121V, and a W-phase power semiconductor module 121W.

Each of the U-phase power semiconductor module 121U, the V-phase power semiconductor module 121V, and the W-phase power semiconductor module 121W is formed of a series connection member consisting of the upper-arm power semiconductor switching device 171 and the lower-arm power semiconductor switching device 172 and a shunt resistor 111, described later. The U-phase power semiconductor module 121U, the V-phase power semiconductor module 121V, and the W-phase power semiconductor module 121W form a 3-phase bridge circuit.

Each of the upper-arm power semiconductor switching device 171 and the lower-arm power semiconductor switching device 172 includes a parallel connection member consisting of an FET (Field Effect Transistor) and a diode.

A shunt resistor 111, which is a current sensor, is connected between an AC terminal 175 in each of U-phase power semiconductor module 121U, the V-phase power semiconductor module 121V, and the W-phase power semiconductor module 121W and the series connection portion between the upper-arm power semiconductor switching device 171 and the lower-arm power semiconductor switching device 172 in each of the U-phase power semiconductor module 121U, the V-phase power semiconductor module 121V, and the W-phase power semiconductor module 121W. In FIG. 2, for the sake of avoiding the complexity of the drawing, the reference numeral 175 of the AC terminal is provided only to the AC terminal of the U-phase power semiconductor module 121U.

A positive-polarity terminal 173 of each of the U-phase power semiconductor module 121U, the V-phase power semiconductor module 121V, the W-phase power semiconductor module 121W is connected with a positive-polarity terminal 501 of a battery 500 as a DC power source mounted in a vehicle, by way of a positive-polarity conductor 125 of the electric-power supply unit 300, a positive-polarity terminal 190 of the electric-power supply unit 300, and a positive-polarity cable 503. In FIG. 2, for the sake of avoiding the complexity of the drawing, the reference numeral 173 of the positive-polarity terminal 173 is provided only to the positive-polarity terminal of the U-phase power semiconductor module 121U.

A negative-polarity terminal 174 of each of the U-phase power semiconductor module 121U, the V-phase power semiconductor module 121V, the W-phase power semiconductor module 121W is connected with a negative-polarity terminal 502 of the battery 500 as a DC power source mounted in the vehicle, by way of a negative-polarity conductor 126 of the electric-power supply unit 300, a negative-polarity terminal 191 of the electric-power supply unit 300, and a negative-polarity cable 504. The negative-polarity terminal 502 is connected with a vehicle body 700 at a ground potential of the vehicle. In FIG. 2, for the sake of avoiding the complexity of the drawing, the reference numeral 174 of the negative-polarity terminal is provided only to the negative-polarity terminal of the U-phase power semiconductor module 121U.

The AC terminal 175 of each of the U-phase power semiconductor module 121U, the V-phase power semiconductor module 121V, and the W-phase power semiconductor module 121W is connected with the winding terminal of the corresponding phase in the stator winding 31 of the rotating-electric-machine main body 200, by way of a bus bar 211. In FIG. 2, for the sake of avoiding the complexity of the drawing, the reference numeral 211 of the bus bar is provided only to the bus bar that connects the AC terminal 175 of the U-phase power semiconductor module 121U with the stator winding 31.

The positive-polarity terminal 173 of each of the U-phase power semiconductor module 121U, the V-phase power semiconductor module 121V, and the W-phase power semiconductor module 121W is connected with the positive-polarity conductor 125 of the electric-power supply unit 300. The negative-polarity terminal 174 of each of the U-phase power semiconductor module 121U, the V-phase power semiconductor module 121V, and the W-phase power semiconductor module 121W is connected with the negative-polarity conductor 126 of the electric-power supply unit 300.

Each of the U-phase power semiconductor module 121U, the V-phase power semiconductor module 121V, and the W-phase power semiconductor module 121W is connected in parallel with the smoothing capacitor 122 by way of connecting conductors 132 and 133. In FIG. 2, for the sake of avoiding the complexity of the drawing, the reference numerals 132 and 133 of the connecting conductors are provided only to the connecting conductors that are connected with the smoothing capacitor 122 connected in parallel with the W-phase power semiconductor module 121W.

The positive-polarity terminal 134 of each of the smoothing capacitors 122 is connected with the positive-polarity conductor 125 of the electric-power supply unit 300 by way of the connecting conductor 132. The negative-polarity terminal 135 of each of the smoothing capacitors 122 is connected with the negative-polarity conductor 126 of the electric-power supply unit 300 by way of the connecting conductor 133 and a connecting conductor 123. In FIG. 2, for the sake of avoiding the complexity of the drawing, the reference numerals 134 and 135 of the positive-polarity terminal and the negative-polarity terminal, respectively, are provided only to the positive-polarity terminal and the negative-polarity terminal of the smoothing capacitor 122 connected in parallel with the W-phase power semiconductor module 121W. For the sake of avoiding the complexity of the drawing, the reference numeral 123 of the connecting conductor is provided only to the connecting conductor 123 that is connected with the smoothing capacitor 122 and the V-phase power semiconductor module 121V.

A signal terminal 176 of each of the upper-arm power semiconductor switching device 171 and the lower-arm power semiconductor switching device 172 in each of the U-phase power semiconductor module 121U, the V-phase power semiconductor module 121V, and the W-phase power semiconductor module 121W is formed in such a way as to be connected with the control board 124 illustrated in FIG. 1 and to receive a control signal from a control circuit unit provided on the control board. FIG. 2, for the sake of avoiding the complexity of the drawing, the reference numeral 176 of the signal terminal is provided only to the signal terminal of the lower-arm power semiconductor switching device 172 the U-phase power semiconductor module 121U.

The power semiconductor module 121 is configured in the following manner—the foregoing upper-arm power semiconductor switching devices 171, the lower-arm power semiconductor switching devices 172, and the shunt resistors 111 are soldered to copper frames; the frames are connected with one another by use of copper plates and aluminum wires; then, these members are sealed with resin. Alternatively, the power semiconductor module 121 is configured in the following manner—the foregoing upper-arm power semiconductor switching devices 171, the lower-arm power semiconductor switching devices 172, and the shunt resistors 111 are soldered to a ceramic substrate or an insulatively coated substrate made of metal such as aluminum or copper.

The power semiconductor module 121 has a heat radiation surface 177 for radiating heat generated by the upper-arm power semiconductor switching devices 171, the lower-arm power semiconductor switching devices 172, and the shunt resistors 111. In the power semiconductor module 121, the foregoing heat radiation surface 177 is mounted on a protruding portion 1401 of the metal housing 140 in such a way as to face the surface of the protruding portion 1401 that is formed in a manner of protruding from the mounting surface, which is a surface, at the side opposite to the rotating-electric-machine main body 200, of the metal housing 140.

In this situation, in the case where on the heat radiation surface 177 of the foregoing power semiconductor module 121, conductive materials in at least part of the upper-arm power semiconductor switching devices 171, the lower-arm power semiconductor switching devices 172, and the shunt resistors 111 are exposed, a predetermined distance between the heat radiation surface 177 and the mounting surface of the metal housing 140 is secured and a heat conductive material having an insulating property is inserted between the heat radiation surface 177 and the mounting surface of the metal housing 140; then, the power semiconductor module 121 is mounted on the protruding portion 1401 of the metal housing 140. As the foregoing heat conductive material, it can be allowed to utilize grease, gel, or an adhesive having viscosity and fluidity or a sheet, a tape, or the like having no fluidity.

In the case where the heat radiation surface 177 of the power semiconductor module 121 is insulated from the upper-arm power semiconductor switching devices 171, the lower-arm power semiconductor switching devices 172, and the shunt resistors 111, an electrically conductive heat conductive material can be utilized instead of the foregoing heat conductive material, and it is not required to secure a distance between the heat radiation surface 177 and the mounting surface of the metal housing 140.

In the metal housing 140, as a cooling mechanism, a coolant channel 147 is formed, along the circumferential direction of the metal housing 140, in a position, inside the metal housing 140, that corresponds to the protruding portion 1401 on which the power semiconductor module 121 is mounted; coolant 148 is made to flow in the coolant channel 147. As a result, heat generated by the upper-arm power semiconductor switching devices 171, the lower-arm power semiconductor switching devices 172, and the shunt resistors 111 of the power semiconductor module 121 is widely and efficiently transferred to the metal housing 140, so that temperature rise can be suppressed.

Although not illustrated, it may be allowed that in the region that is situated in a surface opposite to the surface in which the protruding portion 1401 of the metal housing 140 is formed and that is opposite to the mounting region for the power semiconductor module 121, there are provided one or more heat radiation fins that are formed in such a way as to protrude in a direction perpendicular to the axle direction of the rotating-electric-machine main body 200 and to extend in the radial direction of the rotating-electric-machine main body 200.

Although not illustrated, a magnetic-field circuit unit, as a bridge circuit, formed of semiconductor switching devices and diodes is mounted in the protruding portion 1401 of the metal housing 140 or in a mounting surface other than the protruding portion 1401. The upper arm of the bridge circuit in the magnetic-field circuit unit is connected with the positive-polarity terminal 501 of the battery 500; the lower arm thereof is connected with the negative-polarity terminal 502 of the battery 500. The magnetic-field winding 5 is connected in parallel with the diode of the magnetic-field circuit unit.

Unillustrated electronic components such as a CPU (Central Processing Unit) and the like are mounted on the control board 124; the control board 124 is provided with a control circuit unit that performs on/off control of the semiconductor switching devices of the power circuit unit and the magnetic-field circuit unit in the electric-power supply unit 300. The control circuit unit provided on the control board 124 performs on/off control of the switching devices of the power circuit unit and the magnetic-field circuit unit so as to make the power circuit unit perform electric-power conversion between the DC electric power of the battery 500 and the AC electric power in the stator winding 31 and to make the magnetic-field circuit unit control the magnetic-field current to the magnetic-field winding 5.

The foregoing power semiconductor module 121, the control board 124, and the like are mounted on the mounting surface, which is a surface, at the side opposite to the rotating-electric-machine main body 200, of the metal housing 140. The control board 124 is mounted in the metal housing 140 in such a way as to be situated in parallel with the power semiconductor module 121 in the axle direction of the rotating-electric-machine main body 200 via a gap from the surface, at the side opposite to the metal housing 140, of the power semiconductor module 121. The resin case 131 is mounted on the mounting surface of the metal housing 140 in such a way as to contain the power semiconductor module 121 and the control board 124 mounted on the mounting surface of the metal housing 140. The opening portion, at the side opposite to the metal housing 140, of the resin case 131 is sealed with the resin cover 130, which protects the power semiconductor module 121 and the control board 124, as the electric components mounted on the mounting surface of the metal housing 140, from water, dust, and the like.

Because a potting material 150 is filled into the resin case 131 until the control board 124 is buried, not only the waterproof property and the dust resistance but also the earthquake resistance and the heat-conductive property can be raised. Furthermore, when the cover 130 is made of metal such as aluminum, the heat-conductive property and the heat radiation performance can be raised and noise can be suppressed from propagating. In some cases, it is not required to fill the resin case 131 with the potting material.

The smoothing capacitors 122 are contained in a capacitor case 151 and are mounted on the surface, at the side opposite to the metal housing 140, of the resin cover 130. When the upper-arm power semiconductor switching devices 171 and the lower-arm power semiconductor switching devices 172 in the power semiconductor module 121 are on/off-controlled, it is made possible that the current flowing in the electric-power supply unit 300 is accurately controlled and hence the accuracy of the output and the efficiency are raised; however, not only the output voltage of the electric-power supply unit 300 fluctuates but also a current ripple is caused in the output current.

The smoothing capacitor 122 is to absorb the foregoing voltage fluctuation and current ripple; however, when the current ripple is applied to the smoothing capacitor 122, the smoothing capacitor 122 generates heat and the temperature thereof rises. The temperature rise in the smoothing capacitor 122 deteriorates the smoothing capacitor 122 and shortens its lifetime. Therefore, in order to suppress the deterioration of the smoothing capacitor 122, the capacitor case 151 containing the smoothing capacitors 122 is disposed in such a way as to be exposed to the outside of the electric-power supply unit 300 and to make contact with the outer air. In some cases, in consideration of the amount of the current ripple, the temperature rise, and the like, two or more smoothing capacitors 122 are provided for each phase.

At the outer surface portion, at the side opposite to the rotor 6, i.e., at the side where the electric-power supply unit 300 is mounted, of the rear bracket 2, the brush 100 is mounted in the peripheral portion of the rotor axle 4. Although not illustrated, an energization unit electrically connected with the magnetic-field winding 5 is mounted on the rotor axle 4; when the sliding portion of the brush 100 makes contact with the energization unit, the output of the magnetic-field circuit unit is inputted to the magnetic-field winding 5.

FIG. 3 is an explanatory view illustrating the electric-power supply unit at a time when the rotating electric machine 1000 is viewed from the side opposite to the load; FIG. 1 is a cross-sectional view at a time when the cross section along the line A-A in FIG. 3 is viewed in the arrow direction. The electric-power supply unit 300 and the brush 100 are arranged on respective axle-direction outer end-faces, of the rear bracket 2, that are planes substantially the same as each other. The foregoing second ventilation path R2 is formed between the inner circumferential portion of the electric-power supply unit 300 and the outer circumferential portion of the brush 100. The foregoing third ventilation path R3 that connects the second air inlet 21 with the second air outlet 22 is formed between the axle-direction inner endface of the rear bracket 2 and the rotor 6.

Three capacitor cases 151 corresponding to the three respective phases are provided; as illustrated in FIG. 3, one capacitor case 151 is disposed at each of the both sides of the second ventilation path R2, and one capacitor case 151 is disposed under the second ventilation path R2. This arrangement makes it possible to effectively cool the three capacitor cases 151 with second cooling air W2.

At mounting units (unillustrated) provided in the front bracket 1 and the rear bracket 2, the rotating electric machine 1000 is robustly fixed with bolts to the vehicle body 700 of the vehicle or to the internal combustion engine. The rear bracket 2 and the vehicle body 700 are electrically connected with each other through the stator iron core 32 and the front bracket 1. In the case where the metal housing 140 and the negative-polarity terminal 502 of the battery 500 can electrically be connected with each other through the vehicle body 700, the negative-polarity cable 504 can be omitted.

Next, the flow of the current in the rotating electric machine 1000 will be explained. The current flow in the case where the rotating electric machine 1000 operates as an electric motor and the current flow in the case where the rotating electric machine 1000 operates as an electric power generator differ from each other; however, in this Embodiment, the case where the rotating electric machine 1000 operates as an electric motor will be explained.

The current that flows in the stator winding 31 of the rotating-electric-machine main body 200 flows from the positive-polarity terminal 501 of the battery 500 into the electric-power supply unit 300, by way of the positive-polarity cable 503 and the positive-polarity terminal 190; then, the foregoing current flows into the stator winding 31 by way of the upper-arm power semiconductor switching device 171 and the shunt resistor 111 of the power semiconductor module 121 of a predetermined phase; after that, the foregoing current flows into the metal housing 140 by way of the shunt resistor 111 of another phase and the lower-arm power semiconductor switching device 172 of the power semiconductor module 121 and then flows into the negative-polarity terminal 502 of the battery 500 by way of the negative-polarity terminal 191 and the negative-polarity cable 504.

Based on a current value detected through the shunt resistor 111, a rotation speed of the rotating electric machine 1000 and/or information on a rotation position of the rotor from the unillustrated rotation sensor, respective temperatures of the upper-arm power semiconductor switching device 171 and the lower-arm power semiconductor switching device 172, and the like, the CPU mounted on the control board 124 calculates a control pattern for on/off-controlling the upper-arm power semiconductor switching device 171 and the lower-arm power semiconductor switching device 172. Based on the result of the calculation by the CPU, the control circuit unit provided on the control board 124 generates control signals and provides the control signals to the respective signal terminals of the upper-arm power semiconductor switching device 171 and the lower-arm power semiconductor switching device 172.

In the rotating electric machine according to Embodiment 1, configured in such a manner as described above, the electric-power supply unit 300 converts the DC electric power of the battery 500 into AC electric power; then, the AC electric power is supplied to the stator winding 31. As a result, a rotating magnetic field is generated in the stator iron core 32; then, the rotor 6 rotates. Then, the first cooling fan 73 and the second cooling fan 74 rotate in conjunction with the rotation of the rotor 6. Accordingly, at the front side of the rotating electric machine 1000, the first cooling air W1 taken in through the first air inlet 11 flows through the first ventilation path R1 and then is exhausted to the outside of the rotating electric machine 1000 through the first air outlet 12. Then, the first cooling air W1 flowing through the first ventilation path R1 cools the coil end of the stator winding 31.

In contrast, at the rear side of the rotating electric machine 1000, the second cooling air W2 flows through the second ventilation path R2, which is formed between the inner circumferential portion of the electric-power supply unit 300 and the outer circumferential portion of the brush 100, toward the load in the axle direction of the rotating electric machine 1000 and then flows into the rotating-electric-machine main body 200 through the second air inlet 21; then, the second cooling air W2 passes through the third ventilation path R3 and is exhausted to the outside of the rotating-electric-machine main body 200 through the second air outlet 22.

Due to the rear-side bearing 72 provided in the rear bracket 2, the inner circumferential portion of the second ventilation path R2 is bent toward the axle-direction outer side of the rotating electric machine 1000; thus, in some cases, the second ventilation path R2 flows toward the axle-direction outer side before being taken in by the second air inlet 21. Therefore, the inner diameter of a through-hole 1402 formed in the inner circumferential portion of the metal housing 140 is gradually expanded toward the load side of the rotating electric machine 1000. As a result, the flow of the second cooling air W2 can be smoothened. Moreover, the outer diameter of a bearing holding portion 201 in the rear bracket 2 is formed in such a way as to gradually expand toward the load side of the rotating electric machine 1000; thus, the flow of the second cooling air W2 can further be smoothened.

The foregoing capacitor case 151, the brush 100, the metal housing 140, the rear bracket 2, and the rotor 6 are exposed to the second cooling air W2. Accordingly, heat generated in the power semiconductor module 121 is radiated to the second cooling air W2 through the intermediary of the metal housing 140; heat generated in the smoothing capacitors 122 is radiated to the second cooling air W2 through the intermediary of the air in the capacitor case 151 and the capacitor case 151; frictional heat of the rear-side bearing 72 and heat generated in the stator 3 is radiated to the second cooling air W2 through the intermediary of the rear bracket 2; heat generated in the magnetic-field winding 5 is radiated to the second cooling air W2 through the intermediary of the rotor 6. As a result, the temperature rise in each of the constituent members of the rotating electric machine 1000 is suppressed. The second cooling air W2 flowing through the third ventilation path R3 cools the coil end of the stator winding 31.

When although not illustrated, a heat conductive material is inserted into the gap between the smoothing capacitor 122 and the inner wall of the capacitor case 151, the thermal resistance from the smoothing capacitor 122 to the capacitor case 151 can be decreased; thus, the temperature of the smoothing capacitor 122 can further be lowered. The insertion of the heat conductive material into the gap between the smoothing capacitor 122 and the inner wall of the capacitor case 151 makes it possible to raise the vibration resistance, as well.

As the foregoing heat conductive material to be inserted into the gap between the smoothing capacitor 122 and the inner wall of the capacitor case 151, low-viscosity grease, gel, adhesive, a sheet, a tape, or the like can be utilized; alternatively, a material the same as that of the foregoing potting material 150 can also be utilized. In the case where two or more smoothing capacitors 122 are provided, the heat conductive material is inserted between the smoothing capacitors, so that the smoothing capacitors are thermally connected with each other and hence the temperature difference between the smoothing capacitors can be reduced. Accordingly, the increase or decrease in the electric resistance, caused by the temperature difference between the smoothing capacitors, does not cause a low-electric-resistance smoothing capacitor to appear; thus, it can be prevented that an excessive current flows in a certain smoothing capacitor and hence the lifetime thereof is shortened.

When the heat conductive material is disposed over the whole outer circumference of the smoothing capacitor 122, the heat transfer effect is further raised; however, because the heat conductivity of the heat conductive material is higher by one or two digits than that of air, the temperature decreasing effect for the smoothing capacitor 122 is raised even when the heat conductive material is disposed only over part of the outer circumference of the smoothing capacitor 122. The capacitor case 151 may be made of resin; however, when the capacitor case 151 is made of metal such as aluminum, the heat-conductive property and the heat radiation performance can further be raised.

Moreover, because a guide wall 144 is provided at the outer side, in the axle-direction of the second air inlet 21, of the rear bracket 2, it is made possible to make the second cooling air W2 securely flow into the second air inlet 21. Moreover, when the guide walls 144 are arranged over the whole outer circumferential portions of the second air inlets 21, with which the circumference, around the rotor axle 4, of the rear bracket 2 are dotted, it is made possible to guide the second cooling air W2 to the respective second air inlets 21 and to make the second cooling air W2 securely flow into the rear bracket 2 of the rotating-electric-machine main body 200. The guide wall 144 may be provided either in the rear bracket 2 or in the metal housing 140.

When in the case where the guide wall 144 is provided in the rear bracket 2, a material with which the gap between the metal housing 140 and the guide wall 144 is filled is inserted between the metal housing 140 and the guide wall 144, it can be prevented that the second cooling air W2 leaks out to the outside of the guide wall 144. When in the case where the guide wall 144 is provided in the metal housing 140, a material with which the gap between the rear bracket 2 and the guide wail 144 is filled is inserted between the rear bracket 2 and the guide wall 144, it can be prevented that the second cooling air W2 leaks out to the outside of the guide wall 144.

A first cooling fin 143 that protrudes from the inner circumferential surface of the second air inlet 21 in the rear bracket 2 is provided; thus, the heat radiation performance of the rotating-electric-machine main body 200 can be raised. The first cooling fin 143 is required only to have a shape that protrudes from the inner circumferential surface of the second air inlet 21 into the space of the second air inlet 21; the first cooling fin 143 may be provided in such a way as to protrude from the inner circumferential surface, at the radial-direction outer side, of the second air inlet 21 toward the radial-direction inner side; alternatively, the first cooling fin 143 may be provided in such a way as to protrude from the inner circumferential surface, at the radial-direction inner side, of the second air inlet 21 toward the radial-direction outer side.

Moreover, a second cooling fin 142 is provided in the surface, of the rear bracket 2, that faces the metal housing 140; because the second cooling fin 142 make it possible to raise the heat radiation performance of the rear bracket 2, the temperature of the rotating-electric-machine main body 200 can be lowered. Because the guide wall 144 is provided, the second cooling fin 142 raises the heat radiation performance for natural air cooling, and the first cooling fin 143 raises the heat radiation performance for the second cooling air W2.

Because the rotating electric machine 1000 according to Embodiment 1 is configured in such a manner as described above, the expansion in the radial direction is suppressed, and heat generation in each of the power semiconductor module 121, the control board 124, the smoothing capacitor 122, the brush 100, the stator 3, the magnetic-field winding 5, the rotor 6, the rear-side bearing 72, the front-side bearing 71, and the like is radiated to the first cooling air W1 and/or the second cooling air W2 and hence the temperatures thereof can be lowered.

Moreover, the coolant 148 is made to flow in the metal housing 140 so that the coolability of the electric-power supply unit 300 can be raised. The coolant channel 147 can be formed by providing an unillustrated flow channel cover at the rear bracket 2 side of the metal housing 140; alternatively, the coolant channel 147 can be formed by connecting a pipe made of metal such as copper, aluminum, or SUS with the metal housing 140 through bonding, crimping, brazing, or the like; alternatively, the coolant channel 147 can be produced, for example, by forming a cavity at a time of casting. When the coolant channel 147 is disposed at a portion, of the metal housing 140, that corresponds to the power semiconductor module 121, which generates a particularly large amount of heat, a high cooling effect can be obtained. When the foregoing material with which the gap between the guide wall 144 and the rear bracket 2 or the metal housing 140 is filled is a heat conductive material, the heat of the rotating-electric-machine main body 200 is radiated to the coolant 148 and hence the coolability thereof can be raised.

FIG. 4 is a cross-sectional view at a time when the cross section along the line B-B in FIG. 3 is viewed in the arrow direction. In FIG. 4, as far as the brush 100 is concerned, the longitudinal cross section thereof is illustrated. The second ventilation path R2 is provided between the inner circumferential portion of the electric-power supply unit 300 and the outer circumferential portion of the brush 100; thus, because the second cooling air W2 makes contact with the whole of the outer circumferential portion of the brush 100, the brush 100 can effectively be cooled.

Embodiment 2

Figure 5:
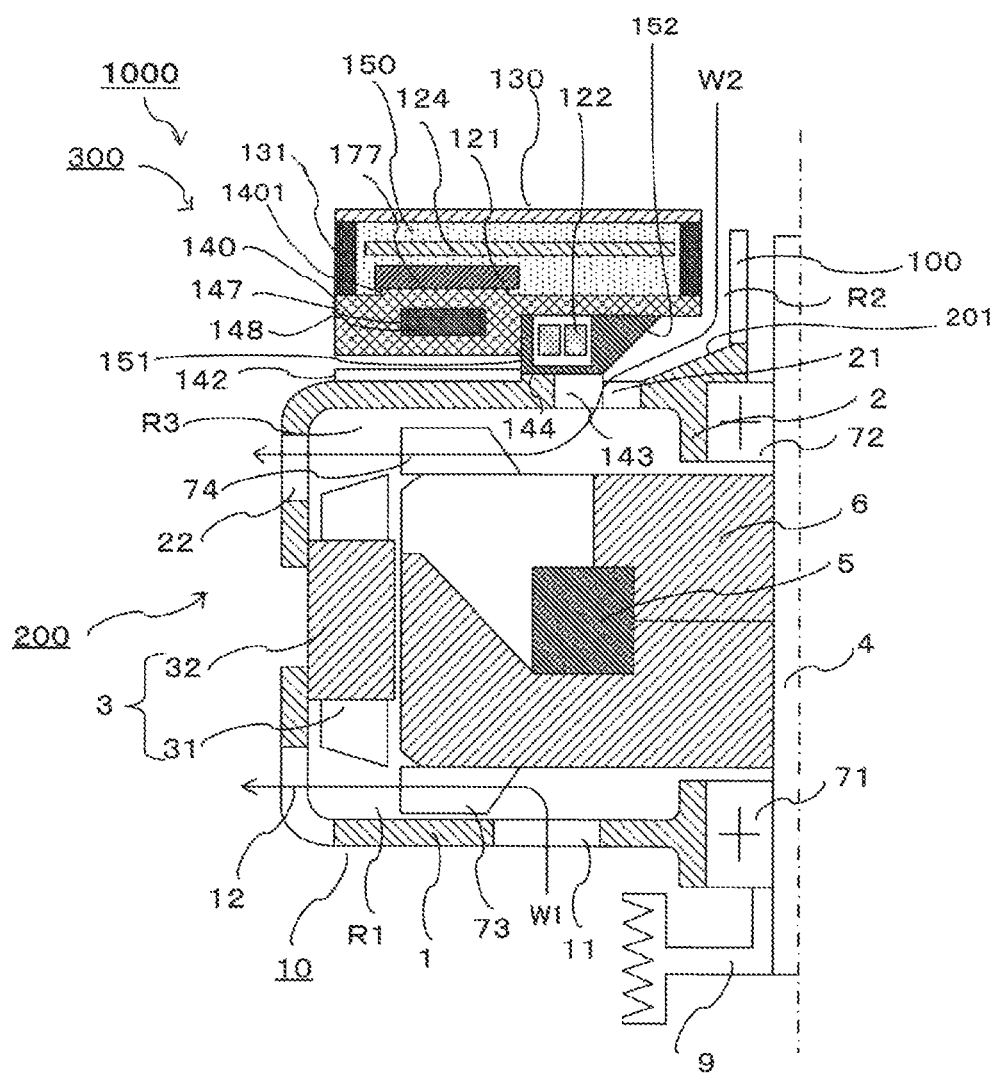
FIG. 5 is a principal-part cross-sectional view illustrating a rotating electric machine according to Embodiment 2.
Figure 6:
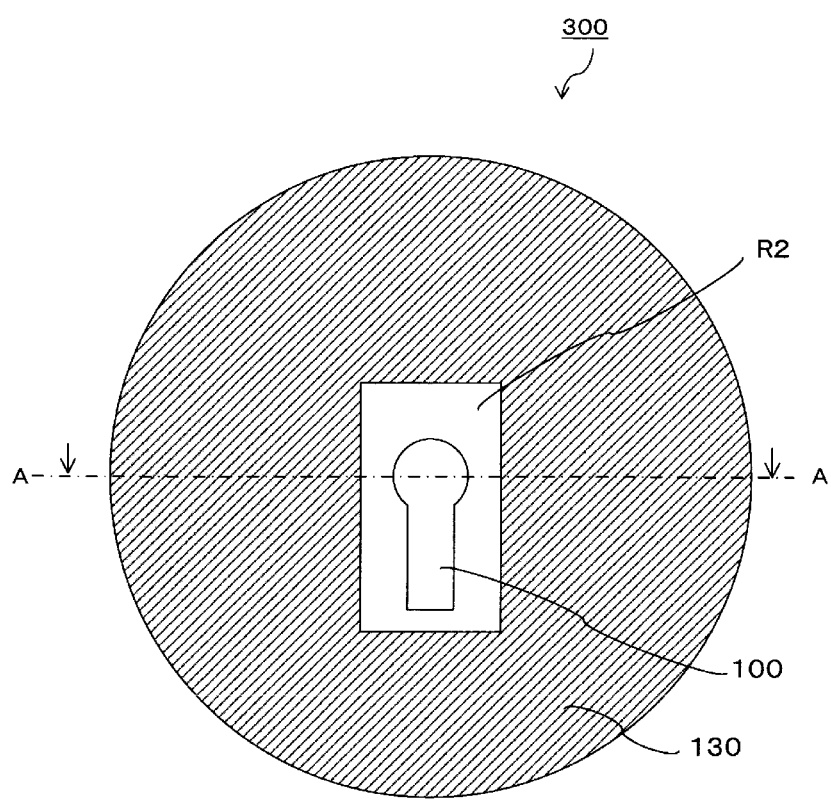
FIG. 6 is an explanatory view illustrating an electric-power supply unit of the rotating electric machine according to Embodiment 2.

Next, a rotating electric machine according to Embodiment 2 of the present application will be explained. The rotating electric machine according to Embodiment 2 has functions the same as those of the foregoing rotating electric machine according to Embodiment 1. The circuit diagram in FIG. 2 is applied also to Embodiment 2. FIG. 5 is a principal-part cross-sectional view illustrating the rotating electric machine according to Embodiment 2; FIG. 6 is an explanatory view illustrating an electric-power supply unit of the rotating electric machine according to Embodiment 2. The rotating electric machine according to Embodiment 2 is configured as a rotating electric machine for starting an internal combustion engine.

In FIGS. 5 and 6, the electric-power supply unit 300 is provided with the power semiconductor modules 121, the smoothing capacitors 122, the resin case 131, the control board 124, the metal housing 140, the brush 100, and the rotation sensor (unillustrated).

The power semiconductor module 121 is configured in the same manner as the power semiconductor module 121 in Embodiment 1; the power semiconductor module 121 has an unillustrated upper-arm power semiconductor switching device, an unillustrated lower-arm power semiconductor switching device, and the heat radiation surface 177 for radiating heat generated in a shunt resistor; the heat radiation surface 177 is mounted in such a way as to face the protruding portion 1401 of the metal housing 140. As a result, heat generated in each of the upper-arm power semiconductor switching device, the lower-arm power semiconductor switching device, and the shunt resistor is transferred to the metal housing 140 so that the temperature thereof can be suppressed from rising.

The foregoing power semiconductor module 121, the control board 124, and the like are mounted on the mounting surface, which is a surface, at the side opposite to the rotating-electric-machine main body 200, of the metal housing 140. The control board 124 is mounted in the metal housing 140 in such a way as to be situated in parallel with the power semiconductor module 121 in the axle direction of the rotating-electric-machine main body 200 via a gap from the surface, at the side opposite to the metal housing 140, of the power semiconductor module 121. The resin case 131 is mounted on the mounting surface of the metal housing 140 in such a way as to contain the power semiconductor module 121 and the control board 124 mounted on the mounting surface of the metal housing 140. The opening portion, at the side opposite to the metal housing 140, of the resin case 131 is sealed with the resin cover 130, which protects the power semiconductor module 121 and the control board 124, as the electric components mounted on the mounting surface of the metal housing 140, from water, dust, and the like.

Because the potting material 150 is filled into the resin case 131 until the control board 124 is buried, not only the waterproof property and the dust resistance but also the earthquake resistance and the heat-conductive property can be raised. Furthermore, when the cove 130 is made of metal such as aluminum, the heat-conductive property and the heat radiation performance can be raised and noise can be suppressed from propagating. In some cases, it is not required to fill the resin case 131 with the potting material.

The smoothing capacitors 122 are contained in the capacitor case 151 and are mounted on the surface, at the rotating-electric-machine main body 200 side, of the metal housing 140. In order to cool the smoothing capacitors 122, the capacitor case 151 is disposed in such a way as to make contact with the metal housing 140 and the second cooling air W2, which is the outer air. An inclined wall 152 of the capacitor case 151 is formed in such a way as to incline to the radial-direction outer side of the rotating-electric-machine main body, from the side opposite to the rotating-electric-machine main body to the rotating-electric-machine main body side; moreover, the outer diameter of the bearing holding portion 201 in the rear bracket 2 is formed in such a way as to gradually expand toward the rotating-electric-machine main body 200; thus, the flow of the second cooling air W2 can be smoothened.

In some cases, in accordance with the amount of the current ripple and the temperature rise, two or more smoothing capacitors 122 are provided for each of the three phases; the smoothing capacitors 122 are arranged over the whole inner circumference of the metal housing 140 or in a separate manner. The inclined wall 152 of each of the capacitor cases 151 is exposed to the second ventilation path R2. The capacitor case 151 may be made of resin; alternatively, when the capacitor case 151 is made of metal such as aluminum, the heat-conductive property and the heat, radiation performance can be raised. When the resin case 151 and the metal housing 140 are integrated with each other, the heat radiation performance can further be raised. Because the smoothing capacitor 122 is disposed in a space between the electric-power supply unit 300 and the rotating-electric-machine main body 200, the vibration resistance is raised.

A space for disposing the second cooling fin 142, as a cooling element, exists between the metal housing 140 and the rear bracket 2; thus, when the smoothing capacitor 122 is disposed by use of part of this space, the rotating electric machine 1000 can be suppressed from expanding in the axle direction.

FIG. 6 is an explanatory view at a time when the electric-power supply unit 300 is viewed from the side opposite to the load of the rotating electric machine 1000; FIG. 5 is a cross-sectional view at a time when the cross section along the line A-A in FIG. 6 is viewed in the arrow direction. The brush 100 is disposed on a plane substantially the same as the plane on which the electric-power supply unit 300 is disposed; the second ventilation path R2 is formed between the inner circumferential portion of the electric-power supply unit 300 and the outer circumferential portion of the brush 100. The third ventilation path R3 that connects the second air inlet 21 with the second air outlet 22 is formed between the axle-direction inner endface of the rear bracket 2 and the rotor 6.

In the rotating electric machine according to Embodiment 2, configured in such a manner as described above, the electric-power supply unit 300 converts the DC electric power of the battery 500 into AC electric power; then, the AC electric power is supplied to the stator winding 31. As a result, a rotating magnetic field is generated in the stator iron core 32; then, the rotor 6 rotates. Then the cooling fans 73 and 74 rotate in conjunction with the rotation of the rotor 6. Accordingly, at the front side of the rotating electric machine 1000, the first cooling air W1 taken in through the first air inlet 11 flows through the first ventilation path R1 and then is exhausted to the outside of the rotating electric machine 1000 through the first air outlet 12. Then, the first cooling air W1 flowing through the first ventilation path R1 cools the coil end of the stator winding 31.

In contrast, at the rear side of the rotating electric machine 1000. The second cooling air W2 flows through the second ventilation path R2, which is formed between the inner circumferential portion of the electric-power supply unit 300 and the outer circumferential portion of the brush 100, toward the load in the axle direction of the rotating electric machine 1000 and then flows into the rotating-electric-machine main body 200 through the second air inlet 21; then, the second cooling air W2 passes through the third ventilation path R3 and is exhausted to the outside of the rotating electric machine 1000 through the second air outlet 22.

Due to the rear-side bearing 72 provided in the rear bracket 2, the inner circumferential portion of the second ventilation path R2 is bent toward the radial-direction outer side of the rotating electric machine 1000; thus, in some cases, the second cooling air W2 flows toward the radial-direction outer side before being taken in by the second air inlet 21. However, the inclined wall 152 of the capacitor case 151 is formed in such away as to gradually incline in the radial direction toward the rotating-electric-machine main body 200; thus, the flow of the second cooling air W2 can be smoothened. Moreover, the outer diameter of the bearing holding portion 201 in the rear bracket 2 is formed in such a way as to gradually expand toward the rotating-electric-machine main body 200; thus, the flow of the second cooling air W2 can further be smoothened.

The foregoing capacitor case 151, the brush 100, the metal housing 140, the rear bracket 2, and the rotor 6 are exposed to the second cooling air W2. Accordingly, heat generated in the power semiconductor module 121 is radiated to the second cooling air W2 through the intermediary of the metal housing 140; heat generated in the smoothing capacitors 122 is radiated to the second cooling air W2 through the intermediary of the air in the capacitor case 151 and the capacitor case 151; frictional heat of the rear-side bearing 72 and heat generated in the stator 3 is radiated to the second cooling air W2 through the intermediary of the rear bracket 2; heat generated in the magnetic-field winding 5 is radiated to the second cooling air W2 through the intermediary of the rotor 6. As a result, the temperature rise in each of the constituent members of the rotating electric machine 1000 is suppressed. The second cooling air W2 flowing through the third ventilation path R3 cools the coil end of the stator winding 31.

In the case where the capacitor cases 151 are separately arranged around the second ventilation path R2, the through-hole, in the metal housing 140, that makes contact with the second ventilation path R2 may gradually expand in the radial direction toward the rotating-electric-machine main body 200, as is the case with Embodiment 1.

When although not illustrated, a heat conductive material is inserted into the gap between the smoothing capacitor 122 and the inner wall of the capacitor case 151, the thermal resistance from the smoothing capacitor 122 to the capacitor case 151 can be decreased; thus, the temperature of the smoothing capacitor 122 can further be lowered. The insertion of the heat conductive material into the gap between the smoothing capacitor 122 and the inner wall of the capacitor case 151 makes it possible to raise the vibration resistance, as well.

As the foregoing heat conductive material to be inserted into the gap between smoothing capacitor 122 and the inner wall of the capacitor case 151, low-viscosity grease, gel, adhesive, a sheet, a tape, or the like can be utilized; alternatively, a material the same as that of the foregoing potting material 150 can also be utilized. In the case where two or more smoothing capacitors 122 are provided, the heat conductive material is inserted between the smoothing capacitors, so that the smoothing capacitors are thermally connected with each other and hence the temperature difference between the smoothing capacitors can be reduced. Accordingly, the increase or decrease in the electric resistance, caused by the temperature difference between the smoothing capacitors, does not cause a low-electric-resistance capacitor to appear; thus, it can be prevented that an excessive current flows in a certain smoothing capacitor and hence the lifetime thereof is shortened.

When the heat conductive material is disposed over the whole outer circumference of the smoothing capacitor 122, the heat transfer effect is further raised; however, because the heat conductivity of the heat conductive material is higher by one or two digits than that of air, the temperature decreasing effect for the smoothing capacitor 122 is raised even when the heat conductive material is disposed only over part of the outer circumference of the smoothing capacitor 122. The capacitor case 151 may be made of resin; however, when the capacitor case 151 is made of metal such as aluminum, the heat-conductive property and the heat radiation performance can further be raised.

Moreover, because a guide wall 144 is provided at the outer side, in the axle-direction of the second air inlet 21, of the rear bracket 2, it is made possible to make the second cooling air W2 securely flow into the second air inlet 21. Moreover, when the guide walls 144 are arranged over the whole outer circumferential portions of the second air inlets 21, with which the circumference, around the rotor axle 4, of the rear bracket 2 are dotted, it is made possible to guide the second cooling air W2 to the respective second air inlets 21 and to make the second cooling air W2 securely flow into the rear bracket 2 of the rotating-electric-machine main body 200. Because the guide wall 144 holds the capacitor case 151 and the rear bracket 2, it is also made possible that the vibration resistance is further raised. The guide wall 144 may be provided in the capacitor case 151.

When in the case where the guide wall 144 is provided in the rear bracket 2, a material with which the gap between the metal housing 140 and the guide wall 144 is filled is inserted between the metal housing 140 and the guide wall 144, it can be prevented that the second cooling air W2 leaks out to the outside of the guide wall 144. When in the case where the guide wall 144 is provided in the metal housing 140, a material with which the gap between the rear bracket 2 and the guide wall 144 is filled is inserted between the rear bracket 2 and the guide wall 144, it can be prevented that the second cooling air W2 leaks out to the outside of the guide wall 144. When in the case where the guide wall 144 is provided in the capacitor case 151, a material with which the gap between the rear bracket 2 and the guide wall 144 is filled is inserted between the rear bracket 2 and the guide wall 144, it can be prevented that the second cooling air W2 leaks out to the outside of the guide wall 144.

A first cooling fin 143 that protrudes from the inner circumferential surface of the second air inlet 21 in the rear bracket 2 is provided; thus, the heat radiation performance of the rotating-electric-machine main body 200 can be raised. The first cooling fin 143 is required only to have a shape that protrudes from the inner circumferential surface of the second air inlet 21 into the space of the second air inlet 21; the first cooling fin 143 may be provided in such a way as to protrude from the inner circumferential surface, at the radial-direction outer side, of the second air inlet 21 toward the radial-direction inner side; alternatively, the first cooling fin 143 may be provided in such a way as to protrude from the inner circumferential surface, at the radial-direction inner side, of the second air inlet 21 toward the radial-direction outer side.

Moreover, a second cooling fin 142 is provided in the surface, of the rear bracket 2, that faces the metal housing 140; because the second cooling fin 142 make it possible to raise the heat radiation performance of the rear bracket 2, the temperature of the rotating-electric-machine main body 200 can be lowered. Because the guide wall 144 is provided, the second cooling fin 142 raises the heat radiation performance for natural air cooling, and the first cooling fin 143 raises the heat radiation performance for the second cooling air W2.

The guide wall 144 is provided at the radial direction outside of the second air inlet 21 in the rear bracket 2; the first cooling fin 143 is provided in such a way as to face the inner circumference of the second air inlet 21 in the rear bracket 2; the second cooling fin 142 is provided on the surface, of the rear bracket 2, that faces the metal housing 140; as a result, the heat radiation performance can be raised.

Because the rotating electric machine 1000 according to Embodiment 2 is configured in such a manner as described above, the expansion in the radial direction is suppressed, and heat generation in each of the power semiconductor module 121, the control board 124, the smoothing capacitor 122, the brush 100, the stator 3, the magnetic-field winding the rotor 6, the rear-side bearing 72, the front-side bearing 71, and the like is radiated to the first cooling air W1 and/or the second cooling air W2 and hence the temperatures thereof can be lowered.

Moreover, the coolant 148 is made to flow in the metal housing 140 so that the coolability of the electric-power supply unit 300 can be raised. The coolant channel 147 can be formed by providing an unillustrated flow channel cover at the rear bracket 2 side of the metal housing 140; alternatively, the coolant channel 147 can be formed by connecting a pipe made of metal such as copper, aluminum, or SUS with the metal housing 140 through bonding, crimping, brazing, or the like; alternatively, the coolant channel 147 can be produced, for example, by forming a cavity at a time of casting. When the coolant channel 147 is disposed at a portion, of the metal housing 140, that corresponds to the power semiconductor module 121, which generates a particularly large amount of heat, a high cooling effect can be obtained. When the foregoing material with which the gap between the guide wall 144 and the rear bracket 2 or the metal housing 140 is filled is a heat conductive material, the heat of the rotating-electric-machine main body 200 is radiated to the coolant 148 and hence the coolability thereof can be raised.

When the coolant 148 is made to flow in the metal housing 140, the coolability of the electric-power supply unit 300 can further be raised. Because the distance between the coolant 148 and the smoothing capacitor 122 is shortened, the coolability of the smoothing capacitor 122 can further be raised. Cooling the smoothing capacitor 122 makes it possible to prolong the lifetime thereof or to increase the amount of a ripple current that is allowed to flow therein; thus, because a smaller smoothing capacitor can be utilized or the number of the smoothing capacitors can be decreased, the rotating electric machine can further be downsized and lightened.

The present disclosure is not limited to the rotating electric machine for starting an internal combustion engine according to each of foregoing Embodiments 1 and 2; furthermore, it should be understood that the various features, aspects and functions described in Embodiments 1 and 2 are not limited in their applicability to the particular embodiment with which they are described, but instead can be applied, alone or in various combinations to the embodiment. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A rotating electric machine comprising:
   a rotating-electric-machine main body; and
   an electric-power supply unit,
   wherein the rotating-electric-machine main body and the electric-power supply unit are arranged in parallel with each other in an axle direction of the rotating-electric-machine main body so as to be integrally fixed to each other,
   wherein the rotating-electric-machine main body includes
      a stator fixed to a housing,
      a rotor fixed to a rotor axle pivotably supported by the housing, and
      a cooling fan that rotates along with the rotor, that makes an air inlet being provided in the housing and having an opening in the axle direction take cooling air into the housing, and that makes an air outlet provided in the housing exhaust the cooling air to the outside of the housing,
   wherein the electric-power supply unit includes
      a power circuit unit provided with a power semiconductor module for controlling electric power to be supplied to the rotating-electric-machine main body and a smoothing capacitor for smoothening an electric current flowing in a stator winding of the rotating-electric-machine main body,
      a control board provided with a control circuit unit for controlling the power circuit unit, and
      a metal housing on which the power circuit unit and the control board are mounted, and
   wherein the smoothing capacitor is mounted on the metal housing, at a position where the smoothing capacitor is cooled by the cooling air that is taken into the air inlet from the outside of the housing, wherein the metal housing has a through-hole in the central portion thereof, wherein the air inlet of the housing takes in the cooling air through the through-hole in the metal housing, and wherein the smoothing capacitor is mounted at a position in a peripheral portion of the through-hole.

2. The rotating electric machine according to claim 1, wherein the inner diameter of the inner circumferential wall of the through-hole in the metal housing gradually expands toward the rotating-electric-machine main body side.

3. The rotating electric machine according to claim 1, wherein the metal housing has a function as a metal housing that cools at least the power semiconductor module.

4. The rotating electric machine according to claim 1, wherein the metal housing has a coolant channel for making coolant flow therein.

5. The rotating electric machine according to claim 1,
wherein in a wall face thereof at the side opposite to the rotating-electric-machine main body side, the metal housing has a protruding portion that protrudes toward the side opposite to the rotating-electric-machine main body side, and
wherein the power semiconductor module is mounted on the protruding portion.

6. The rotating electric machine according to claim 1, wherein at a peripheral portion of the air inlet, a guide wall for guiding the cooling air to the air inlet is provided.

7. The rotating electric machine according to claim 1, further including a case that contains the power semiconductor module and the control board, wherein the case is fixed to a wall face, at the side opposite to the rotating electric machine side, of the metal housing.

8. The rotating electric machine according to claim 7, wherein the case is filled with a potting material for burying the power semiconductor module and the control board.

9. The rotating electric machine according to claim 1, wherein the smoothing capacitor is disposed at the side, opposite to the rotating-electric-machine main body side, of the metal housing.

10. The rotating electric machine according to claim 9,
wherein a plurality of the smoothing capacitors are provided,
wherein there are provided a plurality of capacitor cases, each of which separately contains a predetermined number of the smoothing capacitors among the plurality of the smoothing capacitors, and
wherein the plurality of capacitor cases are separately mounted on the metal housing.

11. The rotating electric machine according to claim 1, wherein the smoothing capacitor is disposed at the rotating-electric-machine main body side of the metal housing.

12. The rotating electric machine according to claim 11,
wherein a plurality of the smoothing capacitors are provided,
wherein there are provided a plurality of capacitor cases, each of which separately contains a predetermined number of the smoothing capacitors among the plurality of the smoothing capacitors, and
wherein the plurality of capacitor cases are separately mounted on the metal housing.

13. The rotating electric machine according to claim 12 further including a capacitor case that contains the smoothing capacitor, wherein at a position adjacent to the air inlet of the housing, the capacitor case is mounted on the metal housing.

14. The rotating electric machine according to claim 13, wherein the capacitor case has an inclined wall that inclines to the radial-direction outer side of the rotating-electric-machine main body, from the side opposite to the rotating-electric-machine main body side to the rotating-electric-machine main body side.

15. The rotating electric machine according to claim 1, further including a brush for supplying an electric current to a magnetic-field winding provided in the rotor, wherein the brush is disposed in a flow path of the cooling air that is taken into the air inlet of the housing.

* * * * *